3,120,469
THERAPEUTIC DENTAL COMPOSITION
Istvan Tamas, 4967 S. Sedgewick Road, Lyndhurst, Ohio
No Drawing. Filed Sept. 24, 1959, Ser. No. 841,945
16 Claims. (Cl. 167—93)

The present invention relates generally to the art of tooth care and treatment and is more particularly concerned with a novel composition of matter having special utility for treatment and protection of teeth and with a unique method of treating teeth to provide them with protection over substantial periods of time by arresting or blocking salivary calculus formation, which is the main cause of the periodontal disease, pyorrhea.

The problem of dental decay prevention has received the attention of a large number of researchers and inventors but has not been eliminated or reduced to such an extent that it could be said to have been practically solved. Promising results have been obtained by fluoridization of drinking water and also by the regular and frequent use of certain prophylactic dentifrices and anticaries agents effective to destroy tooth decay-producing organisms in the mouth. However, these approaches to the problem have limitations and shortcomings and furthermore do not afford any help to those who are suffering from periodontal disease, which cause a loss of five times as many teeth as dental decay.

The problem to which this invention is addressed concerns the prevention of tartar formation and resulting gum irritation and infection. In many individuals these hard, gritty deposits of tartar build up rapidly and physical removal of them, requiring considerable time, expense and unpleasantness, is necessary at short intervals. The penalty for failure to have these deposits removed before they build up to a degree where gum involvement follows may be receding gums, pyorrhea and loss of teeth. No substantial progress has been made toward a solution of the problem of periodonatal disease and, to the best of my knowledge, the only effective prior means known for treating patients with a tendency toward tartar formation is the physical removal procedure described above.

This problem also concerns the treatment of the teeth and the gums of the pyorrhea patient who suffers frequently from pain attributable to exposure of a portion of a root of an otherwise sound tooth due to withdrawal of the gum. Thermal shock, sweet and acid are frequently the causes for this pain just as it is in the case of the tooth having a deep cavity. In fact, the sensation in each case is substantially the same and is due to the same nerve response.

In accordance with the present invention, tooth and gum protection against decay-causing or promoting organisms can be obtained over substantial periods of time compared to the protection afforded by known dentifrices, gum and the like. Furthermore, this protection is immediate and direct. Still further, according to this invention, protection over a substantial period of time can be provided against the formation of harmful tartar deposits, films and other pyorrhea causing substances. In other words, the teeth are protected thereby against formation of deposits of salivary calculus on the teeth and such coatings or deposits in small quantities that may form are easily and quickly removed where the teeth have been treated in accordance with this invention.

A further advantage of this discovery resides in the fact that it affords the individual, as well as the dentist, a tool for effectively protecting sensitive teeth against the pain of thermal shock and toothache-producing food substances for substantial periods of time. Thus, the pyorrhea patient as well as the person who has a deep dental cavity can be effectively relieved of pain due to exposure of the tooth root or the pulp chamber and this protection can be provided either by the dentist or by the patient with assurance that it will last for a matter of days rather than minutes.

In general, the new composition of matter embodying the present invention is a non-toxic, non-sensitizing, non-irritating oral preparation which is capable of forming a substantially continuous film on the teeth, which will adhere tenaciously to the teeth under the conditions of chemical and physical nature such as normally prevail in the oral cavity and which will inhibit salivary calculus formation.

The present composition of matter invention may be embodied in a variety of substances. In very simple forms, it may consist of cerain titanium compounds cross-linked with silicone oils. Preferably, a lithium compound is closely associated with the silicone oil and the titanium compound. Since the pH of the composition of matter should range between about 7.0 and 9.0 and preferably about 8, and since the titanium chelates and the lithium compounds are highly alkaline, acidic, water-soluble gum may be used as a neutralizing agent. Such a gum may also serve as a vehicle and as a means of giving the composition a viscous mucilage consistency. Other substances may be added to any one of the foregoing simple compositions if, and when, desired as will be illustrated in the specific examples to be set forth hereinafter.

I am aware of the fact that the various prior workers in the art have from time to time suggested the use of silicones to prevent the adhesion of tars, stains, tartar and the like to the teeth. However, none of such proposals has been satisfactory for the very good reason that the silicone oils are harmfully affected by the saliva and are rinsed away from the teeth before they can do any good. There is the added disadvantage of using silicones as such that they attacked the naked teeth, cementum, dentine, roots, cavities and gums and causes severe toothache pain, and the like.

I have found that by cross-linking silicone oils with other substances as described above, the silicones may be made resistant to the powerful action of the saliva and may be prevented from attacking the teeth, gums and the like and causing pain incident thereto.

I have further found that when the silicone oils are cross-linked with titanium compounds, the composition of matter has a marked effect on pyorrhea-infected teeth for a limited length of time, for example, a few hours, during which time the pyorrheic teeth are made less sensitive and the formation of tartar is impeded or interrupted.

I have also found that when certain lithium derivates are associated with the titanium compounds and silicone oils, the effects are much more pronounced. Apparently, the equilibrium in the saliva is altered so that the tartar forming substances in the saliva will not harden in the mouth, as is normally the case, but will flow away harmlessly. In other words, when this composition of matter is used, it possesses the desensitizing powers above-described plus the power to prevent tartar formation. Moreover, the lithium ions have the ability to attack the tartar formations and the like at the roots of the infected teeth beyond the reach of the dentist. By reason of the penetration of the composition to those remote places, the composition of matter containing titanium and lithium compounds with silicone oils not only acts to desensitize the teeth and gums and to eliminate or remove freshly deposited tartar, but also to prevent the formation of tartar after the composition has been applied to the teeth. Moreover, inflammation, lesions which are present when the treatment with this composition is begun usually disappears after a few days' use of the composition.

There are several titanium derivates which may be used in making compositions embodying this invention.

One class of such derivates is that of the titanium ortho esters which include tetra isopropyl titanate, tetra n-butyl titanate and tetra stearyl titanate. Another class is that of titanium chelates which include octylene glycol titanate, triethanol amine titanate, triethanol amine titanate-N-oleate, triethanol amine titanate-N-stearate and triethanol amine titanate-N-linseed acids salt. Such of these substances as will hydrolyze in the mouth should be emulsified before application.

Several lithium derivates may be used including lithium hydroxide, lithium hydroxide monohydrate, lithium acetate, lithium fluoride, lithium iodide, lithium titanate, lithium carbonate, lithium stearate and lithium hydroxy stearate.

The silicones which may be used with the present invention include those ranging from about 40 centistokes to about 100,000 centistokes but preferably not higher than about 12,500 centistokes. These compounds include the methyl, the dimethyl, and the methyl phenyl silicones (organopolysiloxanes) which are made by the Dow Corning Company under the trade names of "silicone DC 200," "DC 555," and "DC 1107."

Compositions which may be used to bring the pH value of the compositions of matter embodying the present invention to between about 5 and about 9 may include any of the water-soluble resins and gums, for instance polymers of ethylene oxide which have molecular weights up to about 10,000 and which are collectively known by the name of "Polyox" and which are made by Union Carbide Chemical Company, and also water-soluble carboxy vinyl polymers which are made by B. F. Goodrich Chemical Company under the trade name of "Carbopol 934 and 941."

To the composition of matter embodying the present invention may be added one or more of the following substances: allantoin which is a wound cleansing and cell-proliferating, water soluble chemical having a pH of 5.5 in a saturated aqueous solution; a sterole such as sitosterole, for its healing properties and as an aid in emulsifying where emulsification is desired; polyvinylpyrrolidone (PVP) which acts to increase the viscosity of the composition and as a detoxifier; azulene as a regulator of the action of lithium on an inflamed gum; menthol, oil of wintergreen, glycerine and the like to add flavor or perfume.

Examples of the compositions embodying the present invention are as follows:

Example I

| | Gr. or cc. |
|---|---|
| Lithium fluoride | 0.1 to 3.0 |
| Carbopol 939 | 1.0 to 3.0 |
| Triethanolamine titanate-N-linseed acid salt | 1.0 to 5.0 |
| Dimethyl silicone polymer (DC 200 having a viscosity of 1000 centistokes) | 5.0 to 15.0 |
| Polyox (high viscosity) | 0.5 |
| PVP | 0.5 |
| Distilled water | 100.0 |

The foregoing composition of matter may be made by dissolving the fluoride in distilled water, thoroughly mixing the solution with the Polyox and the Carbopol, then adding the titanium compound and mixing until the composition is viscous and smooth. The pH should be adjusted to between about 7 and about 9. If the composition is to contain any alcohol soluble substances they should be added with the titanium compound. If allantoin, PVP, glycerine or sitosterol or any of the flavoring or perfuming compounds are to be incorporated in the composition they may be added before the pH is adjusted.

Example II

| | Gr. or cc. |
|---|---|
| Lithium stearate | 0.1–3.0 |
| Carbopol 934 | 1.0–2.0 |
| Triethanolamine titanate-N-stearate | 1.0–5.0 |
| Dimethyl silicone polymer (DC 200 having a viscosity of 60,000 centistokes) | 5 to 15 |
| Glycerine | 15.0 |
| PVP | 0.5 |
| Distilled water | 100.0 |

Example III

| | Gr. or cc. |
|---|---|
| Lithium hydroxy stearate | 0.1 to 3.0 |
| Triethanolamine titanate-N-oleate | 0.1 to 5.0 |
| Carbopol 934 | 1.0 to 3.0 |
| Dimethyl silicone polymer (DC 200 having a viscosity of 12,500 centistokes) | 5 to 10 |
| Methyl phenyl silicone polymer (DC 555 having a viscosity of 20 centistokes) | 5–10 |
| Glycerine | 15.0 |
| PVP, menthol, and thymol | 0.5 to 1.0 |
| Distilled water | 100.0 |

Example IV

| | Gr. or cc. |
|---|---|
| Styrene glycol | 0.1 to 0.5 |
| Lithium sulfate | 0.1 to 1.0 |
| (2-hydroxypropyl) sucrose | 0.1 to 0.9 |
| Polyox (5,500 centistokes or higher) | 1.0 to 2.0 |
| Carbopol 941 | 1.0–3.0 |
| PVP | 0.5 to 0.9 |
| Triethanolamine titanate-N-linseed acid salt | 3.0 to 5.0 |
| Dimethyl silicone polymer (DC 200 having a viscosity of 1000 centistokes) and methyl phenyl silicone polymer (DC 555 having a viscosity of 20 centistokes) | 5.0 to 15.0 |
| Oil of wintergreen | 1.0 to 1.5 |
| Distilled water | 100.0 |

Example V

| | |
|---|---|
| Triethanolamine titanate-N-stearate | 0.1 to 5.0 |
| Lithium titanate | 0.1 to 2.0 |
| Polyox (high viscosity) | 0.5 |
| Carbopol 934 | 1.0–3.0 |
| Glycerine | 10.0 |
| Methyl silicone polymer (DC 1107 having a viscosity of 20 centistokes) | 1.0 |
| Dimethyl silicone polymer (DC 200 having a viscosity of 350 centistokes) | 5.0 |
| Dimethyl silicone polymer (DC 200 having a viscosity of 1000 centistokes) | 5.0 |
| Methyl phenyl silicone polymer (DC 555 having a viscosity of 40 centistokes) | 5.0 |
| PVP and oil of wintergreen | 1.0 to 2.0 |
| Distilled water | 100.0 |

Example VI

| | |
|---|---|
| Lithium carbonate | 0.3 to 0.5 |
| Triethanolamine titanate-N-stearate or triethanolamine titanate | 0.1 to 5.0 |
| Dimethyl silicone polymer (DC 200 having a viscosity of 10,000 centistokes) | 10.0 |
| Methyl phenyl silicone polymer (DC 555 having a viscosity of 40 centistokes) | 5.0 |
| Oil of wintergreen | 0.5 to 1.0 |
| Carbopol 934 | 1.0 to 3.0 |
| Glycerine | 5.0 to 10.0 |
| PVP | 0.5 |
| Amino acid as pH stabilizer | 0.5 |
| Allantoin | 0.1 to 0.3 |
| Distilled water | 100.0 |

Example VII

| | |
|---|---|
| Triethanolamine titanate-N-stearate | 0.1–5.0 |
| Lithium hydroxide monohydrate | 0.1 to 3.0 |
| Methyl phenyl silicone polymer (DC 555 having a viscosity of 40 centistokes) | 5.0 to 10.0 |
| Dimethyl silicone polymer (DC 200 having | |

| | |
|---|---|
| a viscosity of 1000 centistokes) | 5.0 to 10.0 |
| Methyl silicone polymer (DC 1107 having a viscosity of 40 centistokes) | 0.5 |
| Oil of wintergreen | 1.0 |
| Carbopol 934 | 1.0–3.0 |
| Dow Chemical Company methyl cellulose (high viscosity, HG 15,000) | 0.5 |
| Polyox | 0.5 |
| Allantoin | 0.3–0.5 |
| PVP | 0.5 |
| Amino acid as pH stabilizer | 0.5 |
| Glycerine | 5.0 |
| Distilled water | 100.0 |

The compositions of Examples II to VII inclusive may be made in the same manner as has been described above in connection with Example I.

*Example VIII*

| | Gr. or cc. |
|---|---|
| Lithium hydroxide monohydrate | 0.1–0.5 |
| Lithium carbonate | 0.3–0.5 |
| Triethanolamine titanate-N-stearate | 0.5–5.0 |
| Methyl phenyl silicone polymer (DC 555 having a viscosity of 40 centistokes) | 5.0 to 15.0 |
| Oil of wintergreen | 1.0 |
| Carbopol 934 | 1.0 to 3.0 |
| PVP | 0.5 |
| Glycerine | 10.0 |
| Distilled water | 100.0 |

This composition may be made as follows: Mix the triethanolamine titanate-N-stearate with silicon polymer and the oil of wintergreen. Add to the resulting mixture the lithium compounds and then add the Carbopol, which should be previously dissolved in distilled water. The pH of this composition should be between about 7 and 9.

*Example IX*

| | Gr. or cc. |
|---|---|
| Tetra isopropyl titanate or tetra-n-butyl titanate | 0.1 to 5.0 |
| Isopropyl alcohol (99%) | 5.0 to 50.0 |
| Propylene glycol (or diethylene glycol) | 5.0 to 25.0 |
| Lithium hydroxide | 0.1 to 2.0 |
| Oil of wintergreen | 1.0 to 5.0 |
| PVP | 0.5 |
| Dimethyl silicone polymer (DC 200 having a viscosity of 350 centistokes) and methyl phenyl silicone polymer (DC 555 having a viscosity of 40 centistokes) | 1.0 to 25.0 |
| Sterol (sitosterol) | 0.1–1.0 |

This composition may be made by the general procedure set forth for Example I.

The hydrophobic tetra-n-butyl titanate clings to the teeth, the hydrophylic part of the compound flows away with the saliva.

*Example X*

| | Gr. or cc. |
|---|---|
| Lithium hydroxy stearate (or Li. stearate) | 0.1 to 15.0 |
| Dimethyl silicone polymer (DC 200 having a viscosity of 1000 centistokes) and methyl phenyl silicone polymer (DC 555 having a viscosity of 20 centistokes) | 5.0 to 50.0 |
| Carbopol 941 or 934 | 1.0–3.0 |
| Glycerine | 10.0 |
| Triethanolamine titanate-N-stearate or triethanolamine titanate | 0.1 to 5.0 |
| Sterol (as emulsifier) | 0.1–1.0 |
| PVP | 0.5 |
| Distilled water | 100.0 |
| Nuodex silicone catalyst oxidizer (benzoyl peroxide with silicone oil) | 0.1 to 1.0 |

This composition may be made by warming the sterol, stearate and the silicone oil at about 75° F. until the stearate is melted and mixing until smooth and creamy, then adding the Carbopol, the glycerine and finally the titanate. After cooling to room temperature the PVP and the catalyst oxidizer are added. After 48 hours 1 or 2 drops of the enzyme, catalase, made by Armour & Co. and sold under the trade name, Armalese A–100, may be added, to drive off the hydrogen peroxide, and to destroy naturally produced peroxide. In order to get more "body" to the emulsion, absorbent fillers may be incorporated as thickening agents, like Cab-o-sil, hydrated aluminum silicate, silicone dioxide, thixcin, bentonite, and the like.

Except where substances are used which are not liquid at room temperatures, such as the stearates, the compositions embodying the present invention may be prepared at room temperatures. Each of Examples I and IV to IX may be prepared at room temperatures. In preparing Examples II and III the stearate should be warmed as stated above in connection with Example X.

It is to be understood that compositions embodying the present invention may be used for topical application by dentists or used in diluted form as mouth washes or as dentifrices after the addition thereto of various solids and liquids customarily incorporated in dentifrices, or as an additive to dentifrices, tooth pastes, tooth powders, dental creams, chewing gums and the like. The term "dentifrice," as used in the claims, is to be understood as meaning and including any of the oral preparations described in the preceding part of this paragraph.

Any of the foregoing compositions may be added to acidic types of toothpastes having a pH of 5 or more to act as desensitizers and pain relievers. Certain of the foregoing compositions, for instance those of Examples VI and X, when added to such acidic toothpastes will additionally be effective in inhibiting salivary calculus formation.

It has been proposed to add small amounts of silicone oils to tooth cleaning compositions containing diatomaceous silica and lithium carbonate for the purpose of prolonging the time the teeth remain clean. Such compositions are only mixtures of the ingredients as contrasted with my compositions in which the silicone oils and the lithium and titanium compounds are chemically combined. Such a mixture does not possess the ability to inhibit the salivary calculus formation and hence could not act as do the chemical compositions of the present invention.

Having thus described this invention in such full, clear, concise and exact terms as to enable any person skilled in the art to which it pertains to make and use the same, and having set forth the best mode contemplated of carrying out this invention, I state that the subject matter which I regard as being my invention is particularly pointed out and distinctly claimed in what is claimed, it being understood that equivalents or modifications of, or substitutions for, parts of the above specifically described embodiment of the invention may be made without departing from the scope of the invention as set forth in what is claimed.

What is claimed is:

1. An anticalculus composition comprising a dentifrice, an organic titanate and an organopolysiloxane.

2. An anticalculus composition comprising a dentifrice, from about 0.1 to about 15% by weight of an organic titanate selected from the group consisting of tetra isopropyl titanate, tetra-n-butyl titanate, tetra stearyl titanate, octylene glycol titanate, triethanolamine titanate, triethanolamine titanate-N-oleate, triethanolamine titanate-N-stearate and triethanolamine-N-linseed acid salt; from about 3.0% to about 50.0% by weight of an organopolysiloxane selected from the group consisting of methyl, dimethyl and methyl phenyl polysiloxanes; and having a pH between about 7 and 9.

3. The organopolysiloxane-containing anticalculus dental preparation of claim 2 wherein the organic titanate is tetra-n-butyl titanate.

4. An anticalculus composition comprising a dentifrice, an organic titanate, a lithium-containing compound, and an organopolysiloxane.

5. An anticalculus dental preparation comprising from about 0.1 to about 15% by weight of an organic titanate selected from the group consisting of tetra isopropyl titanate, tetra-n-butyl titanate, tetra stearyl titanate, octylene glycol titanate, triethanolamine titanate, triethanolamine titanate-N-oleate, triethanolamine titanate-N-stearate and triethanolamine-N-linseed acid salt; a lithium-containing compound not to exceed about 3.0% by weight selected from the group consisting of lithium hydroxide, lithium hydroxide monohydrate, lithium acetate, lithium fluoride, lithium iodide, lithium titanate, lithium carbonate, lithium stearate and lithium hydroxy stearate; from about 3.0% to about 50% by weight of an organopolysiloxane selected from the group consisting of methyl, dimethyl, and methyl phenyl polysiloxanes; and having a pH between about 7 and about 9.

6. The organopolysiloxane-containing anticalculus dental preparation of claim 5 wherein the organic titanate is triethanolamine titanate-N-stearate and the lithium-containing compound is lithium stearate.

7. The organopolysiloxane-containing anticalculus dental preparation of claim 5 wherein the organic titanate is triethanolamine titanate-N-oleate and the lithium-containing compound is lithium hydroxy stearate.

8. The organopolysiloxane-containing anticalculus dental preparation of claim 5 wherein the organic titanate is triethanolamine titanate-N-stearate and the lithium-containing compound is lithium titanate.

9. The organopolysiloxane-containing anticalculus dental preparation of claim 5 wherein the organic titanate is triethanolamine titanate-N-linseed acid salt and the lithium-containing compound is lithium titanate.

10. The organopolysiloxane-containing anticalculus dental preparation of claim 5 wherein the organic titanate is triethanolamine titanate-N-stearate and the lithium-containing compound is a mixture of lithium hydroxide monohydrate and lithium carbonate.

11. The organopolysiloxane-containing anticalculus dental preparation of claim 5 wherein the organic titanate is tetra-n-butyl titanate and the lithium-containing compound is lithium hydroxide.

12. An anticalculus toothpaste comprising, in a toothpaste base, from about 0.1 to about 15% by weight of an organic titanate selected from the group consisting of tetra isopropyl titanate, tetra-n-butyl titanate, tetra stearyl titanate, octylene glycol titanate, triethanolamine titanate, triethanolamine titanate-N-oleate, triethanolamine titanate-N-stearate and triethanolamine-N-linseed acid salt; a lithium-containing compound not to exceed about 3.0% by weight selected from the group consisting of lithium hydroxide, lithium hydroxide monohydrate, lithium acetate, lithium fluoride, lithium iodide, lithium titanate, lithium carbonate, lithium stearate and lithium hydroxy stearate; from about 3.0% to about 50% by weight of an organopolysiloxane selected from the group consisting of methyl, dimethyl, and methyl phenyl polysiloxanes; and having a pH between about 5 and about 9.

13. The organopolysiloxane-containing anticalculus toothpaste of claim 12 wherein the organic titanate is tri-ethanolamine titanate-N-stearate and the lithium-containing compound is lithium carbonate.

14. The organopolysiloxane-containing anticalculus toothpaste of claim 12 wherein the organic titanate is triethanolamine titanate and the lithium-containing compound is lithium carbonate.

15. The organopolysiloxane-containing anticalculus toothpaste of claim 12 wherein the organic titanate is triethanolamine titanate-N-stearate and the lithium-containing compound is lithium hydroxy stearate.

16. The organopolysiloxane-containing anticalculus toothpaste of claim 12 wherein the organic titanate is triethanolamine titanate and the lithium-containing compound is lithium hydroxy stearate.

References Cited in the file of this patent

UNITED STATES PATENTS

| | | |
|---|---|---|
| 2,035,896 | Kerwin | Mar. 31, 1936 |
| 2,069,157 | Sahyun | Jan. 25, 1937 |
| 2,512,058 | Gulledge | June 20, 1950 |
| 2,716,656 | Boyd | Aug. 30, 1955 |
| 2,721,855 | Kin | Oct. 25, 1955 |
| 2,732,318 | Keil | Jan. 24, 1956 |
| 2,732,320 | Guillissen | Jan. 24, 1956 |
| 2,736,721 | Dexter | Feb. 28, 1956 |
| 2,761,782 | Leonard | Sept. 4, 1956 |
| 2,768,909 | Haslam | Oct. 30, 1956 |
| 2,774,690 | Cockett et al. | Dec. 18, 1956 |
| 2,806,814 | Richter | Sept. 17, 1957 |
| 2,807,554 | Serey et al. | Sept. 24, 1957 |
| 2,820,000 | Menzies | Jan. 14, 1958 |
| 2,824,114 | Bostwick | Feb. 18, 1958 |
| 2,838,418 | Starkweather | June 10, 1958 |
| 2,868,750 | Gilkey | Jan. 13, 1959 |
| 2,917,414 | McLean | Dec. 15, 1959 |

FOREIGN PATENTS

| | | |
|---|---|---|
| 285,956 | Great Britain | Feb. 20, 1928 |
| 686,429 | Great Britain | Jan. 21, 1953 |
| 689,679 | Great Britain | Apr. 1, 1953 |

OTHER REFERENCES

Dispensatory of the United States of America, Osol et al., 25th edition, 1955, Part II–III, page 1903.

A Manual of Pharmacology, Torald Sollmann, 1957, pages 1045 and 1046.

Remington's Practice of Pharmacy, Martin and Cook, 1956, page 452.

Grossman: "Polyantibiotic Treatment of Pulpless Teeth," J. Amer. Dent. Assoc. 43, 265–78 (September 1951).

Phatak et al.: "New Silicone Compositions in Dental Practice," J. Dent. Res. 34, 788–89 (October 1955).

Stephens: British Plastics 29, 195 (1956), states the great need to find a material which would form a permanent film on teeth, particularly of children, to prevent caries.

Savers et al.: "In Vitro Study of Change in Contact Angle of Water on Tooth Surface Induced by Different Preservatives and Silicones," J. Dent. Res. 37, 24 (February 1958).